United States Patent Office

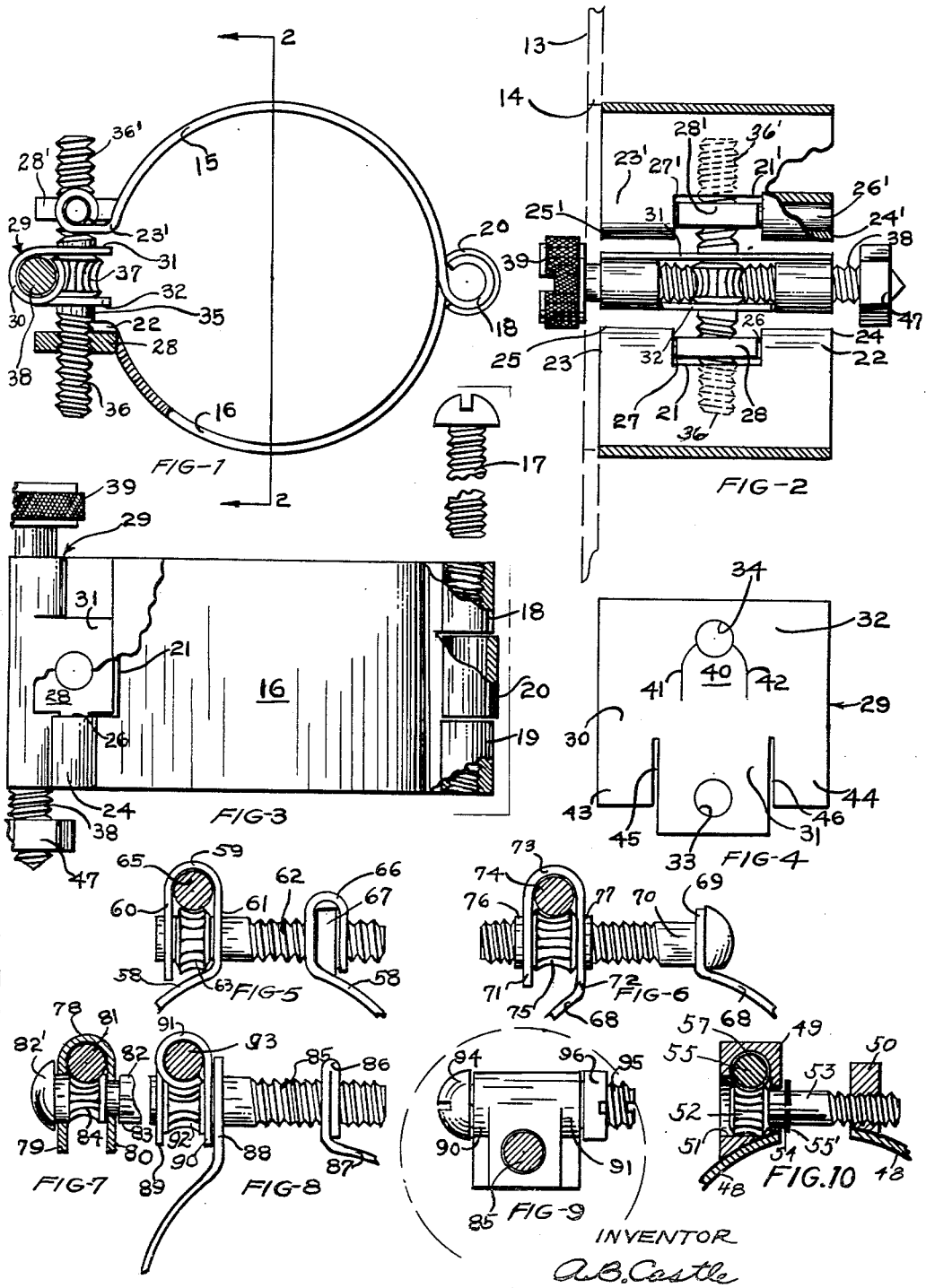

2,938,690
Patented May 31, 1960

2,938,690

INSTRUMENT CLAMPING ASSEMBLY

Alfred B. Castle, 4104 Maryland Drive, Brookmont, Md.

Filed Apr. 26, 1954, Ser. No. 425,692

11 Claims. (Cl. 248—27)

The present invention relates to clamping means and more particularly to operating means for drawing the ends of a circumferential clamping strap together.

Heretofore clamps for gripping the periphery of cylindrical articles have been used and some clamps have been satisfactory for many uses. In clamping instruments, however, on airplane instrument panels the instruments are so close together that the use of conventional bands with screws is not feasible. Various expedients have been proposed for securing the instruments while allowing ready removal and permitting the instrument to be rotated about its axis so the needle of the instrument will point in a particular selected direction when proper operation is indicated. When large numbers of instruments are used they are rotated until a specific pattern of the needles is obtained when proper operation is indicated so the pilot can ascertain the operation with a glance.

The previously used instrument clamps have not allowed accurate control of the clamping pressure, the clamps have become loosened in use, and the opening or closing of the clamps has been uncertain especially when corrosion occurs.

An object of the present invention is to overcome the defects of the prior art clamping devices and to obtain maximum adjusting movement with a minimum of mechanism.

A further object is to provide an instrument clamp which can be operated from the front of an instrument panel and is positive in its clamping and unclamping operations.

Another object is to provide a device for operating a bolt or a nut by a second bolt or nut when direct access to the end of the first bolt or nut is not feasible.

Other and further objects will become apparent upon reference to the accompanying drawing in which:

Figure 1 is an elevation with parts broken away of an instrument holding clamp as seen from the instrument panel side thereof with the attaching screw omitted for simplicity.

Figure 2 is a section taken on line 2—2 of Figure 1 with parts broken away.

Figure 3 is a bottom view with parts broken away of the clamp, with the attaching screw removed.

Figure 4 is a surface development of the bearing and gear housing member, which supports the clamping screw, worm gear and the operating screw.

Figure 5 is a modification in which the housing for the worm gear and operating screw is formed from the free end of the clamping screw.

Figure 6 is a modification in which the clamping screw is fixed to one free end of the strap and the other end is threadedly received in a rotatable nut that has a worm gear exterior surface which co-operates with an operating screw.

Figure 7 is a section taken through the axis of the clamping screw of a further modification in which the clamping screw is provided with a worm gear within the diameter of the bolt.

Figure 8 is another modification in which the clamp can be operated from any direction transverse to the clamping screw showing the worm gear and operating screw supporting housing in one position, but adapted to rotate around the axis of the clamping screw.

Figure 9 is a transverse section looking to the left of the part upward of the strap of Figure 8 and showing other operative positions of the movements of the gear supporting housing by dotted lines.

Figure 10 is a modification of the invention in which the supporting housing for the clamping screw, the worm gear, and operating screw is a single block of material secured to the free end of the strap.

Referring more particularly to the drawing in an instrument panel 13 shown in phantom section is provided with a circular instrument receiving opening 14 therethrough. The instrument (not shown) has a cylindrical casing in the rear of the panel and a circumferential flange which prevents the instrument from passing through the panel. The circumferential flange provides a manually engageable portion for rotating the instrument when necessary.

For securing the instrument in position on the panel, a pair of strap members 15 and 16 of spring metal are hingedly connected together by means of an attaching screw 17 which threadedly engages internally threaded knuckles 18 and 19 on strap member 15. A knuckle 20 on strap 16 is interposed between knuckles 18 and 19 and has its inside diameter unthreaded and of a size to freely receive attaching screw 17 permitting relative pivotal movement of the straps 15 and 16 and permitting disassembly of the straps from one another by removal of screw 17.

The free end of the strap 16 is provided with a cut out 21, the remaining material on each side forming ears 22, 23 which are bent over providing knuckles or bearings 24 and 25 for pivot pins 26 and 27 of a nut 28 are positioned in the cut out.

The free end of strap 15 is provided with a similar cut out 21', ears 22', 23', formed into pivotal mountings or bearings 24', 25' receiving pivot pins 26', 27' of an oppositely threaded nut 28'.

Positioned between the ears of the straps is a channel shaped gear and screw supporting housing 29 which is shown as made of a single sheet of material (Figure 4) shaped into the channel shape of Figs. 1, 2, and 4. Such sheet includes a bight portion 30 which is bent into a half cylinder and web portions 31 and 32 which are arranged in parallel relation and include bearing apertures 33 and 34 for receiving the shaft 35 of a clamping screw having right hand threaded portion 36' and left hand threaded portion 36. A worm gear 37 which may be integral with the shaft or secured thereon by any suitable means provides suitable shoulders engaging the inner surfaces of the webs 31 and 32 preventing end play of the worm gear. The threaded portions of the clamping shaft are screwed in the nuts 28 and 28' whereby rotation of the clamping shaft will draw the free ends of the straps 15 and 16 together or force them apart.

For producing rotation of the clamping shaft a conventional brass screw 38 having a slotted and knurled head 39 is rotatably mounted in the bight portion 30 of the housing 29. By the engagement of the flat upper portions of the threads with the semi-cylindrical inner surface of the bight portion 30 and simultaneous engagement of the threads of the screw with the adjacent teeth of the worm gear 37 by rotation of the operating screw 38 will cause rotation of the clamping shaft when screw 38 is prevented from axial movement.

To provide for assembly of the clamping shaft 35 when the gear 37 is integral therewith, the web portion 32 of the sheet material of the housing is provided with a tongue 40 which remains attached at its edge adjacent the bight 30. The tongue is formed by a stamping or severing operation along line 41 and 42 extending into bearing aperture 34 from the bight portion 30. Such a tongue is of sufficient size for the passage of the worm gear 37 into the housing 29 when such tongue is bent outwardly. The bearing aperture 33 is of sufficient size to permit a slight canting of the shaft 35 during assembly. It will be apparent that the sheet material is bent into the channel or U-shape shown in Figures 1, 2 and 3 prior to the insertion of the shaft 35 and the tongue 40 is thereafter bent into the plane of the web 32 thereby retaining the shaft against displacement. The screw 38 also serves to retain the clamping shaft in position and the tongue 40 may be omitted.

The housing includes tabs 43 and 44 formed by severing the sheet material along lines 45 and 46 while tabs 43 and 44 remain attached to the bight portion 30. Such tabs 43 and 44 are bent around to provide tubular end portions for retaining the operating screw 38 in proper alignment.

From the above description it will be apparent that the instrument clamp will serve to maintain the instrument in correct position. The clamp can be mounted on the rear side of the instrument panel without requiring access to the rear since the huge pin and attaching screw 17 may be removed from the knuckles 18, 19 and 20 permitting the straps 15 and 16 to be separated. Then upon removal of operating screw 38 the entire clamp can be removed through the opening 12. This provides an advantageous feature since a new clamp can be readily substituted for a clamp that has become damaged or needs to be replaced for any reason.

To prevent misalignment of the straps relative to the opening 14 in the instrument panel and to prevent rearward movement of the clamping straps a nut 47 cotter pin or the like may be applied to the rear end of the operating screw 38 thereby avoiding any possibility of the straps being out of alignment with the instrument receiving opening 14. The nut 47 is preferably of the self locking type so that it can serve as a thrust bearing surface on the rear end of the housing 29 to take the reaction of the axial force on operating screw 38 particularly when the clamp is loosened or is being opened to its maximum extent to permit the entry of the instrument. This is advantageous when the clamping straps become stuck on the instrument as when a preservative coating seals the parts together.

In the event of stripping the threads on the operating screw 38 a new screw may be readily substituted. The locking nut 47 may be omitted as the clamping device is operative without it, the instrument taking the reaction in loosening the clamping screw.

If for any reason the clamping screw 35 cannot be operated, the attaching screw 17 may be withdrawn and the knuckles 18, 19 and 20 separated permitting the instrument to be removed and the defective clamp structure may be replaced.

The modification shown in Figure 10 has a continuous strap 48 with a gear housing block 49 fixed to one end and a second block 50 having an internally threaded bore fixed on the other end. The block 49 is provided with a recess 51 receiving a worm gear 52 fixed on a threaded clamping shaft 53 which is journaled in a bore 54 in the block 49. The shaft 53 is threaded into the block 50 whereby rotation of the shaft will draw or separate the blocks from one another thereby producing a clamping or unclamping action. An operating screw 55 having a head, not shown, is rotatably mounted in a smooth bore 57 so that the screw can be rotated without endwise movement and thereby rotate the worm gear 52 and the threaded clamping shaft 53. The inter-engagement of the worm 52 and the operating screw 55 prevents outward movement of the worm during the opening movement urging the blocks 49 and 50 apart. However, a split ring 55' may be mounted in a groove in the shaft 53 to take the end thrust in the opening operation. It will be noted that the operating screw in the various modifications also secures the clamp device including the straps against the rear surface of the instrument panel. After the free ends of the straps have been snugly drawn together the worm gear is stopped by the reaction of the straps against the periphery of the instrument and the stopped worm gear then acts like a nut and further rotation of the operating screw brings the head of the operating screw tightly against the front or exposed surface of the instrument panel thereby maintaining the clamp in fixed position. If desired the clamp may be spaced from the rear surface of the instrument panel by the use of suitable spacing means such as washers between the gear housing and the instrument panel and between the knuckles of the hinge and the panel. The housing may have an extension to provide for this spacing.

The straps may be made of a single piece of material and a threaded anchor block used to provide for attaching the band to the panel by the attaching screw 17. Such anchor block and/or the housing for the clamping and operating screws may have an extension for engaging the rear surface of the instrument panel for spacing the clamping straps from the instrument panel.

In Figure 5 a strap 58 has one end bent upwardly and then back upon itself forming a gear and bearing housing having a bight portion 59, and webs 60 and 61 provided with bearing apertures receiving the shank of a threaded clamping screw 62. A worm gear 63 is integral with or otherwise fixed on the screw shank and is positioned between the webs 60 and 61. The web 60 may be provided with a tongue similar to that shown at 40 to permit assembly of the parts or the webs and bight may be bent around the worm gear and should the material maintain excessive resilience suitable spacing washers such as the horseshoe type spring washers may be used to take up the space between the worm gear and the webs to prevent end play. An operating screw 65 is rotatably mounted between the webs and the bight 59 and engages with worm gear 63. The other end of the strap 58 may be bent upon itself providing a nut retainer 66 in which a nut 67 is mounted. The clamping screw is threaded in the nut so that upon rotation of the operating screw and consequent rotation of the clamping screw the two ends of the strap 58 will be drawn together or separated. If desired the nut 67 may be omitted and the bent over portions of the nut retainer 66 threaded to serve as the nut.

In Figure 6 a clamping strap 68 has one end bent up and provided with an aperture fixedly receiving the head end of a bolt. The other end of the strap is reversely bent forming a housing having webs 71 and 72 connected by a bight 73 which receives an operating screw 74. A nut or worm gear 75 having tubular bosses 76 and 77 extending axially therefrom is threaded on bolt 70 and the bosses 76 and 77 are rotatably mounted in bearing apertures in webs 71 and 72. When the operating screw 74 is rotated while being prevented from axial movement, worm gear 75 rotates on bolt 70 and like a nut draws the ends of the strap 68 together or causes them to separate.

The modification of Figure 7 includes a U-shaped housing having a bight 78 and web portions 79 and 80 with an operating screw 81 freely rotatable in the bight portion. A headed and threaded bolt 82 is rotatably mounted in bearing apertures in webs 79 and 80. A groove 83 may be formed in the shank of the bolt 82 and serves as a thrust bearing for the bolt. A worm gear 84 is formed on the bolt within the outline of the periphery of the shank of the bolt permitting the gear to pass through the bearing aperture in web 79. The web 80 may be provided with a tongue similar to tongue 40 to permit assembly, or the groove 83 may be omitted and the clamping bolt 82 passed through the bearing apertures so the head 82' takes the clamping reaction, the inter-engagement of operating screw 81 with the worm 84 also prevents endwise movement of the clamping bolt 82. If desired a split ring similar to that shown at 55' may be used to maintain the bolt 82 in position.

In Figures 8 and 9 another form of the invention is shown in which the clamping screw 85 is threaded into a bent over end 86 of a strap 87. The clamping screw 85 passes through a bent over end 88 of the strap and is freely rotatable in such bent up end. A U-shaped housing having webs 89 and 90 connected by a bight 91 is provided with bearing apertures receiving the clamping screw 85. A worm gear 92 is formed directly on the shaft 85. The housing is freely rotatable on clamping screw shaft 85 to permit positioning the housing in any position of rotation, shown in Figure 9 by phantom lines. The worm gear 92 provides for end thrust and web 89 may be bent over the stub end of screw 85 for securing the parts together.

An operating screw 93 is rotatably mounted in the bight 91 and engages with the gear teeth on worm gear 92, the screw being guided into position by means of tabs 90 and 91. The screw 93 is provided with a head 94 for operation from one end while a slot 95 and a self-locking slotted nut 96 provide for operation at the other end and serve to take the end thrust on the screw 93. The housing may be rotated completely around the clamping screw shaft 85 when there is no obstruction, and therefore, the clamping screw may be operated from any position by rotation of the housing. This structure is useful for many other applications where it is desired to operate an inaccessible screw and an inaccessible nut may be operated in a manner similar. Such a means is advantageous in attaching clamps such as radiator hose clamps of automobiles and the like.

The parts are preferably made of stainless steel or other noncorrodable material and the operating screw is designed to strip before other parts and such screws can be readily replaced as required.

It will be apparent changes may be made within the spirit and scope of the invention as defined in the following claims.

I claim:

1. A device for operating a shaft by means of an operating screw comprising a channel shaped member of U-shaped cross section with the inner surface of the bight portion thereof being of the same curvature as the curvature of the outside diameter of the screw threads of said operating screw to serve as a bearing for said operating screw, said operating screw having shoulder means, said operating screw being rotatably mounted by the crests of its threads in the bight portion of said channel shaped member, a shaft bearing formed in each web portion of the channel member, a shaft rotatably mounted in said shaft bearings, a worm gear on said shaft having teeth for meshing with the screw threads of said operating screw whereby the conventional screw may rotate said shaft.

2. The invention according to claim 1 in which the shaft has oppositely threaded portions on opposite sides of said worm gear.

3. A device for producing rotation of a threaded element and thereby a tightening or loosening action thereon comprising a threaded element, a worm gear fixed to said threaded element, said threaded element having journal means, a housing having first bearing surface receiving said journal means of said threaded element for rotatably mounting said threaded element in said housing, said housing having second smooth bearing surface extending transversely of said first bearing surface and offset therefrom, an operating screw having shoulder means, said operating screw being mounted with the crests of its threads slidably and rotatably received in said second bearing surface and meshing with said worm gear, an abutment fixed with respect to said housing, the shoulder means of said operating screw being adapted to engage said abutment to take the reaction between the shoulder of the operating screw and the abutment to limit axial movement of the operating screw in the housing during the rotation of said operating screw whereby the operating screw will rotate said threaded element.

4. The invention according to claim 3 in which the threaded element is an elongated shaft having its ends projecting outwardly in both directions from said housing with the projecting ends having opposite male threads, and a strap having its free ends provided with nut means receiving the associated projecting ends having the opposite male threads of said threaded element.

5. The invention according to claim 4 in which the nut means are pivotally mounted on the free ends of the strap on axes transverse to said threaded element.

6. The invention according to claim 5 in which the strap is formed in two sections separably hingedly connected together.

7. The invention according to claim 3 in which the threaded element is a bolt.

8. The invention in accordance with claim 3 in which the threaded element is a nut.

9. The invention according to claim 3 in which additional means are provided to limit axial movement of said operating screw.

10. The invention according to claim 3 in which the housing is channel-shape and the threaded element is a bolt journalled in the flanges of the channel-shape housing and a strap extension of one flange of the channel-shape housing provides a peripheral band and nut means is provided at the free end of the strap receiving the threads of said bolt.

11. Structure for clamping instruments or the like to the surface of an instrument panel comprising an instrument panel having an instrument receiving opening for receiving an instrument in said opening so that a portion of the instrument may extend rearwardly of said panel, said panel having apertures adjacent the periphery of said opening receiving operating and attaching screws, a strap for surrounding the instrument, said strap having nut means at each end thereof, the nut means at one end having opposite threads with respect to the nut means at the other end, a screw threaded element having male threads at its ends corresponding to the threads in said nut means and received in said nut means respectively, a worm gear intermediate the ends of said threaded element, a housing having first bearing surface rotatably mounting said threaded element for rotation therein, second bearing surface in said housing for slidably and rotatably receiving an operating screw, an operating screw extending through one of the apertures of said panel and having the crests of its threads slidably and rotatably received in said second bearing surface of said housing with the crests of the threads serving as the journal of said operating screw, said operating screw having a head for engagement with the front of the panel, the threads of said operating screw meshing with the teeth of said worm gear whereby rotation of said operating screw will rotate said threaded element and draw said clamp tightly around the instrument and further rotation of said operating screw will draw the head of said operating screw against the front surface of the panel thereby securing the strap and the instrument clamped thereby to the panel, and a second headed screw passing through a second aperture of the panel and into positive relation to said strap attaching another portion of the strap to the panel whereby the clamping structure and the instrument may be securely attached to the panel to permit ready attachment, adjustment, and removal of the instrument.

References Cited in the file of this patent

UNITED STATES PATENTS

| | | |
|---|---|---|
| 96,843 | Smith | Nov. 16, 1869 |
| 485,484 | Arnold | Nov. 1, 1892 |
| 830,110 | Spencer | Sept. 4, 1906 |
| 1,596,944 | Philbrook | Aug. 24, 1926 |
| 1,661,132 | Evans | Feb. 28, 1928 |
| 2,078,453 | Miller | Apr. 27, 1937 |
| 2,363,206 | Sprouse | Nov. 21, 1944 |
| 2,399,957 | Tinnerman | May 7, 1946 |
| 2,405,913 | Tinnerman | Aug. 13, 1946 |
| 2,577,063 | Zaleske | Dec. 4, 1951 |
| 2,604,098 | Kranc | July 22, 1952 |
| 2,616,644 | Christophersen | Nov. 4, 1952 |
| 2,679,993 | Christophersen | June 1, 1954 |

FOREIGN PATENTS

| | | |
|---|---|---|
| 461,462 | Germany | June 20, 1928 |